United States Patent [19]

Higgins, Jr.

[11] 4,309,987
[45] Jan. 12, 1982

[54] FLUID FLOW ASSEMBLY FOR SOLAR HEAT COLLECTORS OR RADIATORS

[75] Inventor: Clifford H. Higgins, Jr., Farmington Hills, Mich.

[73] Assignee: H & H Tube & Mfg. Co., Southfield, Mich.

[21] Appl. No.: 121,418

[22] Filed: Feb. 14, 1980

[51] Int. Cl.³ .............................................. F24J 3/02
[52] U.S. Cl. ..................................... 126/448; 165/115
[58] Field of Search ............... 165/159, 158, 175, 170, 165/177, 172; 126/444, 445, 446, 447, 448, 449

[56] References Cited

U.S. PATENT DOCUMENTS

| | | | |
|---|---|---|---|
| 4,027,821 | 6/1977 | Hayes et al. | 126/448 |
| 4,031,881 | 6/1977 | Thiel | 126/448 |
| 4,122,828 | 10/1978 | Diperi | 126/445 |
| 4,210,127 | 7/1980 | Kleine et al. | 126/448 |

*Primary Examiner*—Daniel J. O'Conner
*Attorney, Agent, or Firm*—Hauke and Patalidis

[57] ABSTRACT

A fluid flow assembly for solar heat absorbers, radiators and the like formed of a pair of tubular headers, defining respectively an inlet header and an outlet header, and placed in fluid flow communication by a plurality of tubular members disposed substantially coplanar and parallel, and connected at each end to one of the headers. The end portions of the tubular members project into the headers through a collective slot disposed in the sidewall of each header. The lengths of the tubular member projecting end portions progressively increase in the direction of fluid flow through the inlet header, the shortest projecting end portion being disposed upstream, and the lengths of the tubular member projecting end portions progressively decrease in the direction of fluid flow through the outlet header, the shortest projecting end portion being disposed downstream. When used as solar heat absorbers, for example, the assemblies of the invention are disposed as heat collector units in appropriate areas exposed to sun rays, and a fluid to be heated is circulated from one header to the other, the heat being soaked by the tubular members exposed to the sun rays being transmitted to the circulating fluid which is progressively heated as it flows from the inlet header to the outlet header.

16 Claims, 8 Drawing Figures

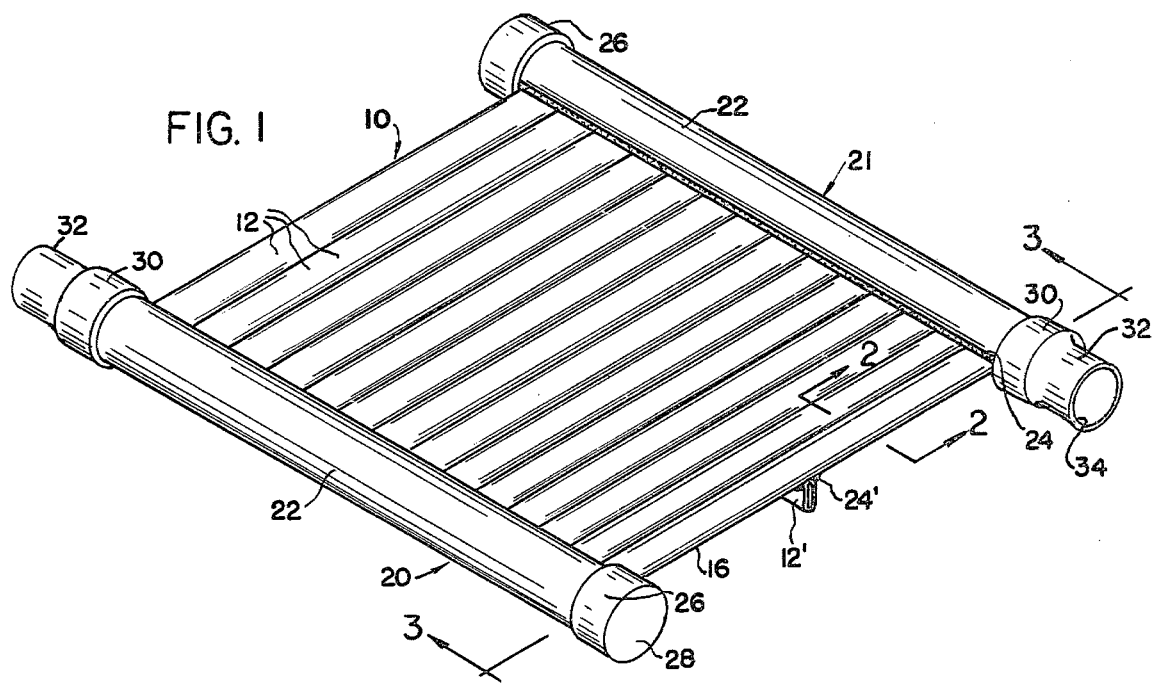
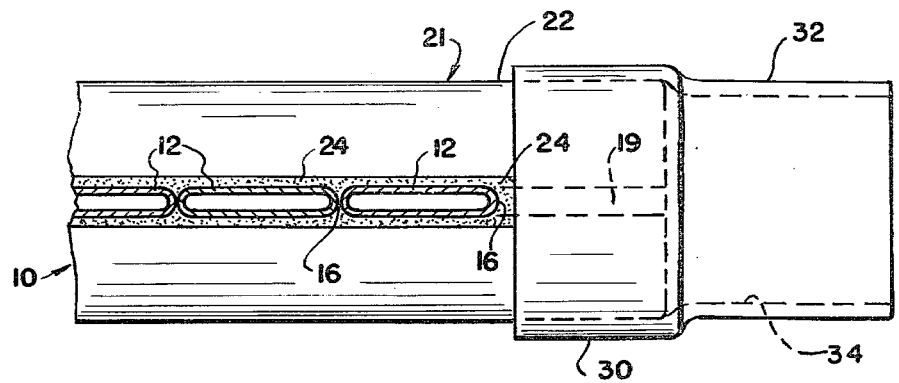
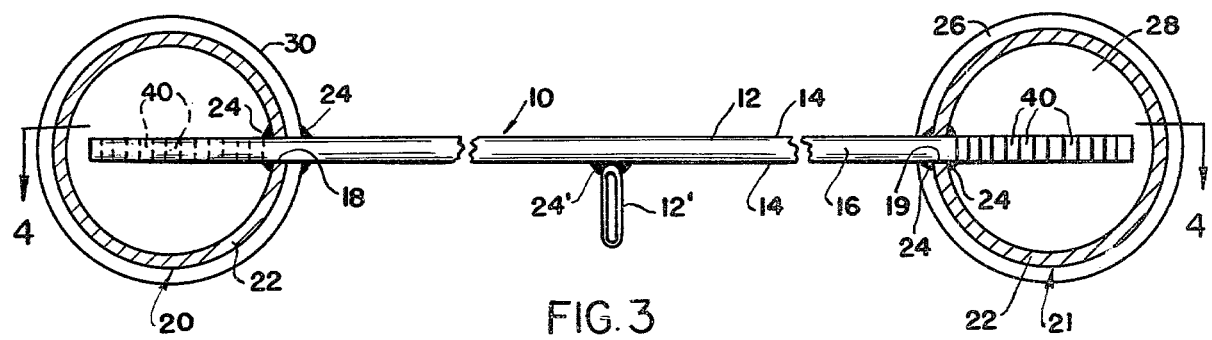

FLUID FLOW ASSEMBLY FOR SOLAR HEAT COLLECTORS OR RADIATORS

BACKGROUND OF THE INVENTION

The invention relates generally to heat exchangers and more particularly to solar heat absorber units for heating by solar heat energy a fluid circulated through the units.

Diverse structures have been proposed and used in the past for the purpose of heating a fluid, preferably a liquid fluid such as water, by way of exposure of the structure to sun rays while the liquid is circulated through the structure from an inlet manifold or header to an outlet manifold or header, the liquid being progressively heated in the course of its flow progression from one header to the other. Examples of prior art methods and apparatus are disclosed in U.S. Pat. Nos. 679,451, 1,250,260, 2,358,476, 2,553,302, 3,076,450, 3,077,190, 3,145,707, 3,190,816, 3,387,602, 3,239,000, 3,273,227, 3,980,071, and Australian patent specifications Nos. 53,407 and 257,425.

Many inconveniences are present in prior art devices, which are due to many reasons, such as the type of materials used for making the solar heat absorber unit, the small volume of liquid flowing through the unit, the complication of many designs, difficulty of manufacturing and the resultant high cost of production, to name a few. Solar energy absorbers most practical under the present state of the art, as far as relative simplicity of structure and relatively low cost, seem to belong generally to two types. The first type takes the form of a plurality of parallel, spaced apart metallic tubes interconnecting an inlet header to an outlet header, soldered or welded to a heat absorbing flat or corrugated panel made of thin metallic sheet or foil. The second type of solar energy absorber panels generally used today is based on a structure, as disclosed in U.S. Pat. No. 3,273,227, made of a pair of superimposed metallic sheets provided at their adjoining areas with a pattern of weld inhibiting material coating, welded together and the areas not provided with the welding inhibiting material, and subsequently inflated under pressure along the unwelded areas to form interconnecting tubular portions. Such structures have in common the disadvantage that the area of the absorber panel through which the liquid is caused to flow, or wetted area, is a relatively small portion of the total area of the panel, with the result that the efficiency, or BTU capability per area unit of such panels, is relatively poor.

SUMMARY OF THE INVENTION

The present invention provides an improved structure for solar energy absorber panels which results in an almost 100% "wetted" area, which permits a high liquid flow rate through a plurality of elongated flat tubular members disposed across the panel from the inlet manifold or cold header to the outlet manifold or hot header supplying heated liquid fluid. The end portions of the elongated tubular members project into the inlet header in a progressively staggered fashion, the shortest projecting end portion being disposed upstream relative to the fluid flow direction, while the end portions projecting into the outlet header are progressively staggered in a reverse order. The present invention is an improvement over application Ser. No. 102,117, filed Dec. 10, 1979, and assigned to the same assignee as the present invention. The present invention accomplishes its objects and results by way of a relatively simple structure utilizing components readily available on the market, and therefore requiring no special method of manufacture, no expensive tooling or fixtures, and requiring only a very small assortment of diverse identical components.

The diverse objects and advantages of the present invention will become apparent to those skilled in the art when the following description of some of the best modes contemplated for practicing the invention is read in conjunction with the accompanying drawing wherein like reference numerals refer to like or equivalent parts and in which:

BRIEF DESCRIPTION OF THE DRAWING

FIG. 1 is a schematic perspective view of a solar energy absorber panel according to the present invention;

FIG. 2 is a partial transverse section along line 2—2 of FIG. 1;

FIG. 3 is a longitudinal section as seen from line 3—3 of FIG. 1;

DETAILED DESCRIPTION OF THE PREFERRED EMBODIMENTS

Figure 4:
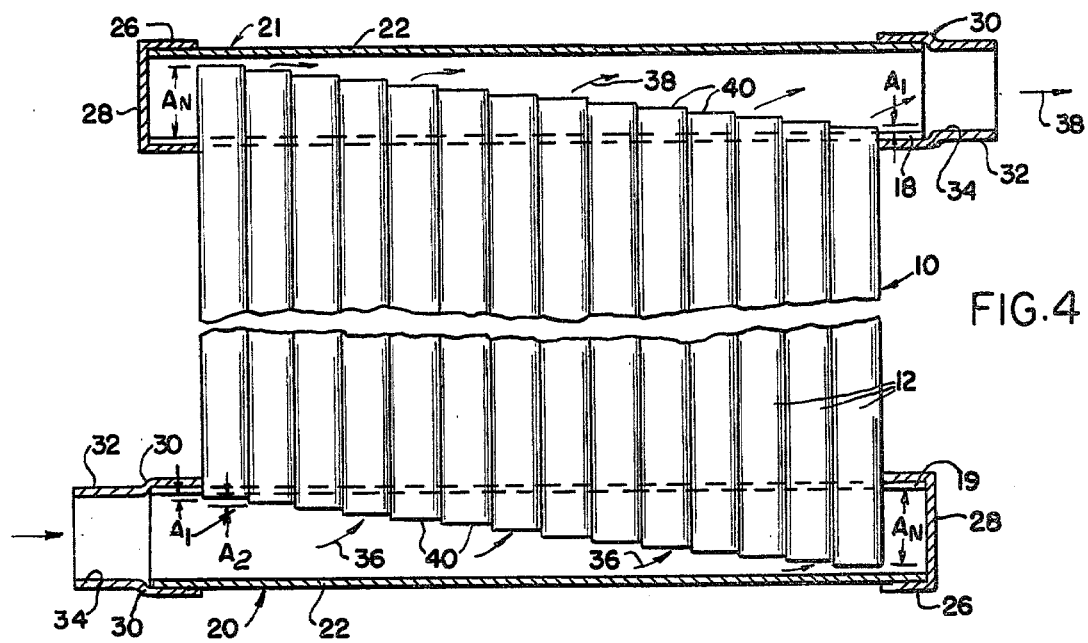
FIG. 4 is a partial plan view from line 4—4 of FIG. 3.

Referring to the drawings, and more particularly to FIGS. 1-4, an example of structure incorporating the present invention takes the form of a solar energy absorber panel 10 for solar heat collector array comprising essentially a plurality of flat tubular members 12 disposed parallel to each other and adjoining one another. Each of the flat tubular members 12, as best shown at FIG. 2, has a pair of opposite, parallel, substantially flat, wide sidewalls 16. The flat tubular members 12 are disposed side by side with each curvilinear sidewall 16 of a tubular member 12 adjoining and touching the corresponding curvilinear sidewall 16 of the adjacent tubular members. The flat tubular members 12 are disposed such that their wide sidewalls 14 disposed on each side of the panel 10 are substantially coplanar, so as to present a large area adapted to be impinged upon by the sun rays when a panel 10 is installed at an appropriate location to act as an absorber and collector of solar heat. The tubular members 12 are collectively fitted at one end through a slot 18, FIGS. 3-4, formed longitudinally through the wall of an inlet manifold or header 20, and at their other end through a slot 19 formed longitudinally through the wall of an outlet manifold or header 21. The inlet and outlet headers 20 and 21 are each in the form of a metallic tube or pipe 22. The flat tubular members are soldered, or brazed to the outer surface and also preferably to the inner surface of the wall of the header 20, as shown at 24 at FIGS. 1-3, at the edge of each of the slots 18 and 19, where they project at their ends through each slot. One, or more, cross-member 12', preferably made of a length of the same flat tube as the tubular members 12, extends laterally on one side of the panel 10 and is soldered, or brazed, as shown at 24', to the exterior surface of the sidewalls 14 of the tubular members 12, such as to increase the rigidity of the assembled panel 10.

Each of the cylindrical tubular members 22 forming the inlet header 20 and the outlet header 21 is cut from standard lengths of metallic tubing of appropriate size, and is provided with a slot 18 or 19 extending longitudinally through a wall of the tubing from one end of the cut length to the other. One end is closed by a plug 26 provided with an end wall 28 and the other end is provided with a tubular fitting 30 having a reduced diameter connector 32, the plug 26 and the fitting 30 being soldered, brazed or welded in position, thus closing the end of the slot 18 or 19 extending to the edge of the length of tubing 22. In the arrangement of FIGS. 1-6, the fitting 30 fastened on the end of the inlet header 20 provides by means of the channel-way 34 in the connector 32 an inlet for connection to an appropriate pipework, not shown, for introducing a fluid into the inlet header 20, such that the fluid after circulating through the separate flat tubular members 12 flows through the outlet header 21 and out of the header through the passageway 34 of the connector 32 of the fitting 30 to a utilization network, not shown.

As best shown at FIGS. 3 and 4, the flat tubings forming the tubular members 12 are cut to substantially the same length, and are connected between the inlet header 20 and the outlet header 21 in parallel with their ends disposed in a staggered fashion. The result is that the first tubular member 12, relative to the direction of flow of the fluid through the inlet header 20, represented by arrows 36, projects only a short distance through the slot 19, such short distance being arbitrarily represented by distance $A_1$, while the last tubular member 12, i.e. the last tubular member downstream of the flow fluid through the inlet header 20 which is disposed closest to the closure plug 26, projects of a distance $A_N$, thus extending almost all the way across the internal bore of the inlet header 20. The same staggered and progressive arrangement of the projecting portions of the other end of the tubular members 12 in the interior of the outlet header 21 is provided, but in a reverse order, such that the end of the first tubular member 12, closest to the end of the header provided with the closure plug 26, projects the farthest into the header interior, preferably of the distance $A_N$, while the last tubular member 12 relative to the direction of fluid flow designated by arrows 38 is either flush with the interior surface of the outlet header 21, or projects a very short distance $A_1$. In the outlet header 21, therefore, the lengths of the projecting end portions of the consecutive tubular members 12 progressively decrease in a downstream direction from a maximum to a minimum. In the structure illustrated at FIGS. 3-4, the ends of several tubular members 12 are cut straight, as shown at 40.

Figure 5:
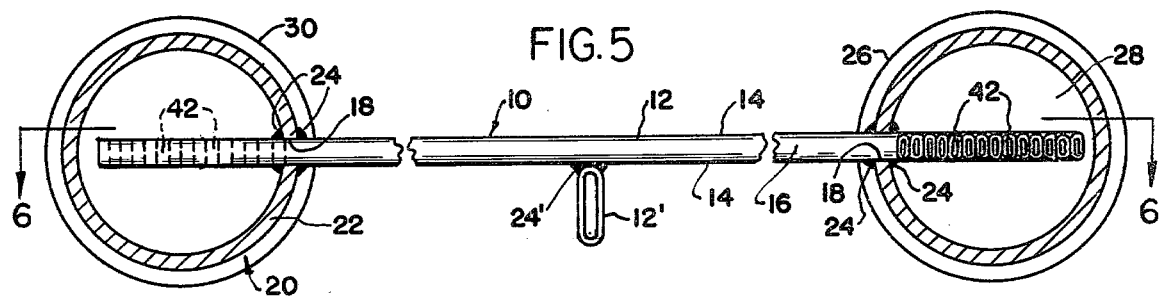
FIG. 5 is a view similar to FIG. 3, but showing a modification of the structure of FIG. 3.
Figure 6:
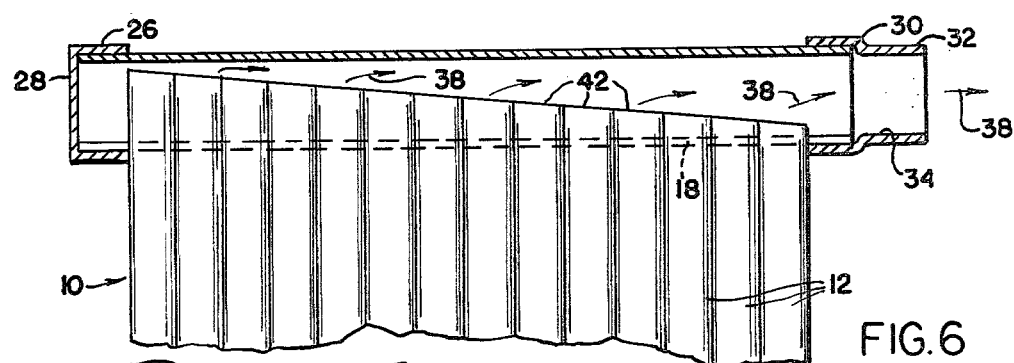
FIG. 6 is a partial plan view from line 6—6 of FIG. 5.

The structure of FIGS. 5-6 is the same as the structure of FIGS. 3-4, that is with the end portions of the several tubular members 12 progressively projecting further into the inlet header 20 from upstream to downstream of the fluid flow therethrough, and their other end portions projecting progressively less through the interior of the outlet header 21, from upstream to downstream relative to the progression of fluid flow therethrough. However, instead of being cut straight, the ends of the flat tubings forming the tubular members 12 are cut at a bevel angle, as shown at 42, such that their end faces are substantially aligned and coplanar, the plane of the end faces being directed at an angle to the longitudinal axis of the header.

It has been discovered that by connecting the tubular members 12 to the headers such that their inlets and outlets are progressively displaced across the width of each header in the manner herein disclosed, the fluid flow rate through the unit 10 is substantially improved, without undue complications in fabrication. In the structure of FIGS. 3-6, all the several flat tubings forming the tubular members 12 are cut at the same length, and the variation of the length at which they progressively project into the respective headers follows a linear progression. In the structure of FIGS. 5-6, the several tubular members 12 are also cut at the same length, the bevel angle being a function of the width of the panel 10 and of the internal diameter of the headers.

Figure 7:
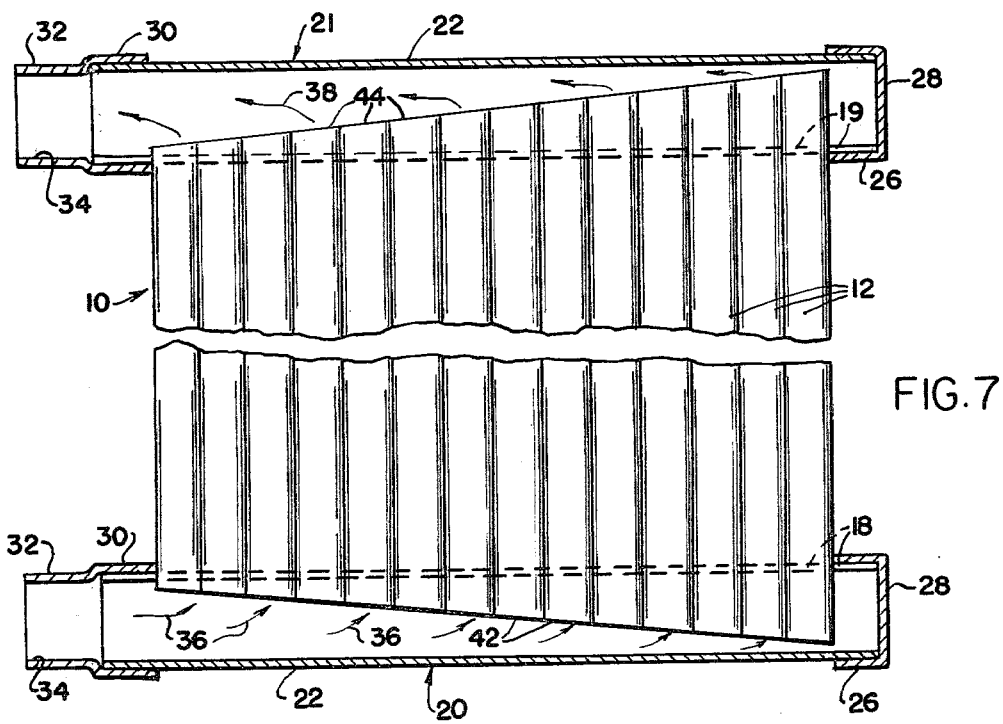
FIG. 7 is a view similar to FIG. 6, but showing a modification thereof.

It is apparent that although one of the headers has been arbitrarily designated as the inlet header and the other as the outlet header to simplify the description of the principles of the invention, the structure of the invention is susceptible of reverse fluid flow without any modification, any of the headers 20 or 21 being used as the inlet header, while the other is used as the outlet header. The inlet and outlet fittings are disposed on one side and the other of the unit 10, in the structures of FIGS. 3-6. In installations where it is desired to provide the inlet and outlet fittings on the same side of the unit 10, a structure as illustrated at FIG. 7 is adopted, wherein the several tubular members 12 are of progressively increasing length from the left-hand one to the right-hand one, as seen in the drawing, such that the projecting ends of the consecutive tubular members 12 into the inlet header 20 are of increasing length across the header from upstream to downstream and of decreasing length across the outlet header 21 from upstream to downstream of the flow of fluid therethrough. The ends of the several tubular members 12, or flat tubings, are thus provided with opposite bevels 42 and 44, as illustrated, although it will be appreciated that the ends of the tubular members may be cut straight and disposed in a staggered fashion progressively projecting further into their respective header, from the end provided with an inlet or outlet fitting 30 to the other end provided with a closure plug 26.

Figure 8:
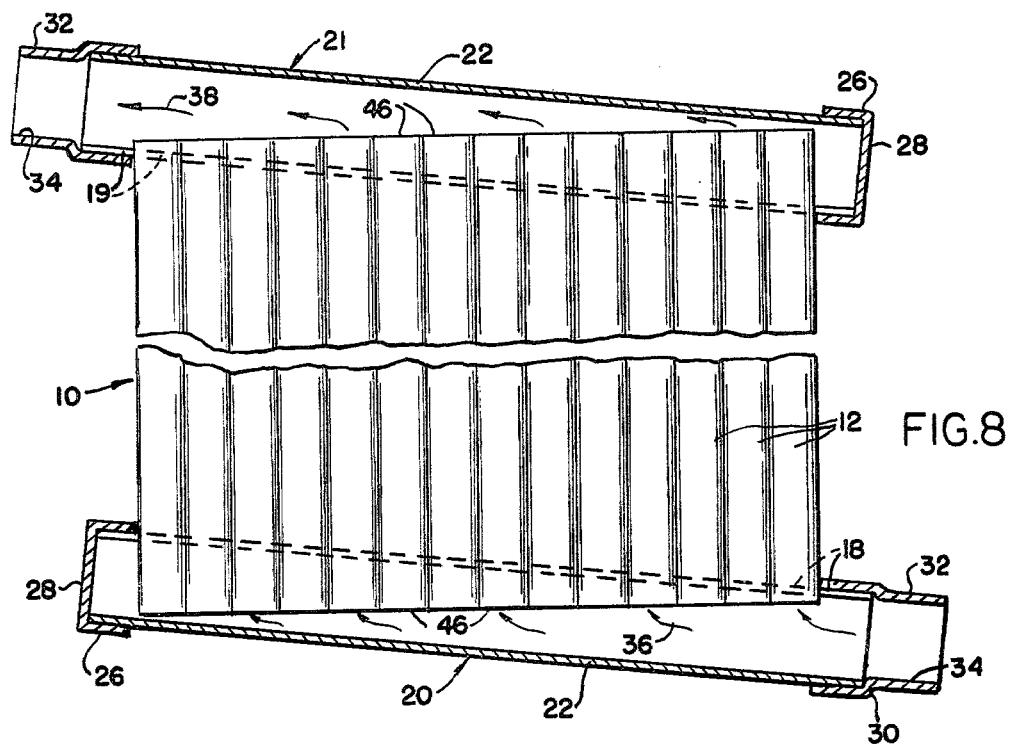
FIG. 8 is a view similar to FIG. 6, but showing a further modification.

FIG. 8 illustrates a further structure for an absorber panel unit 10 or a radiator, or the like, comprising a plurality of tubular members 12 in the form of flat tubes, all cut to the same length and provided with straight end faces 46 disposed in assembly in a single plane perpendicular to the longitudinal axis of the tubular members. Progressive lengths of projection of the end of the tubular members 12 into the interior of the inlet header 20 is provided by disposing the inlet header 20 with its longitudinal axis at an angle to the plane of the even ends 46 of the flat tubular members 12, any by disposing the outlet header 21 substantially parallel to the inlet header 20, such that the other ends of the tubular members 12 progressively project less into the interior of the outlet header 21 from upstream to downstream of the fluid flow therethrough. By way of the structure of FIG. 8, the same results are achieved as with the hereinbefore described structures for units such as solar heat absorbers for solar heat collectors.

It will however be appreciated by those skilled in the art that the structures of the invention can be used for other purposes than solar heat collectors, such as for heat exchangers, radiators, and the like.

The cylindrical tubular members 22 forming the headers 20 and 21 are preferably lengths of readily available copper or stainless steel tubing, and the tubular members 12 are preferably made of lengths of copper or stainless steel seamless or seamed flat tubing, also readily available at relatively low cost in the market. Soldering of the ends of the flat tubular members 12 to the edges of the slots 18 and 19 through the walls of the headers 20 and 21 may be effected manually, automatically or by dipping. Brazing or welding may also be used. If it is desired to enlarge the cross area of each tubular member 12 for the passage of liquid from one header to the other, the tubular members 12 may be conveniently expanded by plugging the open end of one of the headers and applying pressure through the other header open end, for example up to 130–150 psi, which results in expanding slightly the thin walled tubular members 12 and in testing under pressure the structural integrity of the assembly, including the soldering or brazing of the tubular members 12 into the headers 20 and 21, and the soldering or brazing of the header end plugs 26 and fittings 30.

The absorber panel 10 thus forms an integral unit made of a plurality of adjacent juxtaposed thin walled flat tubular members 12 interconnected at their ends by the headers 20 and 21 such as to present a large "wetted" area exposed to solar heat energy and amounting, for all practical purposes, to the sum of the areas of the wide flat sidewalls 14 and of a portion of the curvilinear sidewalls 16 of the tubular members 12. The exposed surface of the panel 10 is preferably provided with a dark heat-absorbing layer or coating.

The absorber panels 10 according to the present invention which are individually, for all practical purposes, full flow high efficiency heat collector and transfer units, may be interconnected, for a large liquid flow rate, in parallel or in series.

It will be appreciated that soldering, brazing or welding may be used for assembling the absorber units of the invention, and that elements made of molded or extruded plastic resins may be substituted for all the metallic elements forming the absorber units. However, it will be readily apparent that a metallic structure is preferable, especially for the heat collecting portion of a solar heat absorber panel or the heat radiating portion of a radiator or heat exchanger, namely the flat thin walled tubular members 12, and that substantial mismatch of the coefficients of expansion of the materials utilized for making the components should be avoided. It will also be appreciated that although the examples of structure described and illustrated herein are addressed principally to solar heat absorber units and radiator units provided with flat thin walled adjacent tubular members, the principles of the invention are applicable to any structure in which a plurality of conduit members are used for transferring a fluid from an inlet manifold or header to an outlet manifold or header, irrespective of the cross area shape of the conduit members and manifolds or headers, and irrespective of whether or not the conduit members are adjacent or spaced apart, or disposed in a single row or several rows.

Having thus described the present invention by way of structural examples thereof, modifications whereof will be apparent to those skilled in the art, what is claimed as new is as follows:

1. A solar heat energy absorber panel comprising an inlet header and an outlet header, and a plurality of elongated tubular members placing said headers in fluid communication, each of said elongated tubular members being in the form of a substantially flat tube having a pair of relatively wide sidewalls disposed substantially parallel and integrally interconnected by a pair of opposite relatively narrow sidewalls, said tubular members being disposed side by side with their relatively wide sidewalls coplanar and each of their relatively narrow sidewalls contiguous with the relatively narrow sidewall of an adjoining tubular member, wherein said headers have each a longitudinal slot formed radially through a wall, the end of each of said elongated tubular members is affixed through said slot and has an end portion projecting into the interior of each of said headers, and said projecting end portions have a length disposed in said inlet header progressively increasing in the direction of fluid flow through said inlet header and have a length disposed in said outlet header progressively decreasing in the direction of fluid flow through said outlet header, wherein said headers are each of a length of pipe of constant diameter from end to end and said slot extends from one end to the other of said length of pipe and each of said length of pipe has a plug affixed on one end and a connector fitting affixed on the other end, said plug and said connector having a wall portion secured over and obturating a corresponding portion of said slot extending between an edge tubular member and the end of said length of pipe.

2. The absorber panel of claim 1 wherein the end of each of said tubular members is substantially parallel to the general axis of fluid flow in said headers.

3. The improvement of claim 2 wherein said tubular members are of substantially equal length.

4. The improvement of claim 3 wherein said tubular members have each a longitudinal axis substantially perpendicular to the longitudinal axis of said headers.

5. The improvement of claim 2 wherein said tubular members are of progressively increasing length.

6. The improvement of claim 5 wherein said tubular members have each a longitudinal axis substantially perpendicular to the longitudinal axis of said headers.

7. The improvement of claim 2 wherein said tubular members have each a longitudinal axis substantially perpendicular to the longitudinal axis of said headers.

8. The improvement of claim 7 wherein said tubular members have their end faces disposed substantially coplanar in each of said headers and have a longitudinal axis at an angle to the longitudinal axis of said headers.

9. The absorber panel of claim 1 wherein the end of each of said tubular members is at an angle to the general axis of fluid flow in said headers.

10. The improvement of claim 9 wherein said tubular members are of substantially equal length.

11. The improvement of claim 10 wherein said tubular members have each a longitudinal axis substantially perpendicular to the longitudinal axis of said headers.

12. The improvement of claim 10 wherein said tubular members have their end faces disposed substantially coplanar in each of said headers and have a longitudinal axis at an angle to the longitudinal axis of said headers.

13. The improvement of claim 9 wherein said tubular members are of progressively increasing length.

14. The improvement of claim 13 wherein said tubular members have each a longitudinal axis substantially perpendicular to the longitudinal axis of said headers.

15. The improvement of claim 9 wherein said tubular members have each a longitudinal axis substantially perpendicular to the longitudinal axis of said headers.

16. The improvement of claim 1 wherein said tubular members have each a longitudinal axis substantially perpendicular to the longitudinal axis of said headers.

* * * * *